United States Patent [19]

Ishii et al.

[11] Patent Number: 4,986,972
[45] Date of Patent: Jan. 22, 1991

[54] METHOD FOR MAKING SILICON NITRIDE POWDER

[75] Inventors: Toshitsugu Ishii; Isao Imai; Akira Sano; Kouichi Sueyoshi, all of Kariya, Japan

[73] Assignee: Toshiba Ceramics Co., Ltd., Japan

[21] Appl. No.: 169,426

[22] Filed: Mar. 17, 1988

[51] Int. Cl.$^5$ .................... C01B 21/063; C01B 33/06
[52] U.S. Cl. .................................................. 423/344
[58] Field of Search ........................................ 423/344

[56] References Cited

U.S. PATENT DOCUMENTS

| 4,280,989 | 7/1981 | Seimiya et al. | 423/344 |
| 4,414,190 | 11/1983 | Seimiya et al. | 423/344 |
| 4,613,490 | 9/1986 | Suzuki et al. | 423/344 |

FOREIGN PATENT DOCUMENTS 0131894  1/1985  European Pat. Off. ............ 423/344

OTHER PUBLICATIONS

College Chemistry, Nebergall et al, D. C. Heath and Company, Boston, pp. 79, 87.

Primary Examiner—John Doll
Assistant Examiner—Lori F. Cuomo
Attorney, Agent, or Firm—Lorusso & Loud

[57] ABSTRACT

A mixture of silica powder and carbon powder is heated in a mixture of $NH_3$ gas and $C_mH_n$ gas. Only silica powder may be heated in a mixture of $NH_3$ gas and $C_mH_n$ gas.

15 Claims, 1 Drawing Sheet

METHOD FOR MAKING SILICON NITRIDE POWDER

BACKGROUND OF THE INVENTION

This invention relates to a method for producing silicon nitride powder.

A silica reducing method is a publicly known method for producing pure silicon nitride powder at a low cost in which a mixture of silica powder and carbon powder is heated in a nitrogen atmosphere. For example, Japanese Patent Publication No. 54-23917 discloses a method of producing silicon nitride powder in which silica powder and carbon powder are mixed with at least one silicon compound selected from the group of silicon nitride powder, silicon carbide powder and silicon oxi-nitride powder and then heated in an atmosphere containing nitrogen gas in such a way that a reducing nitriding reaction may occur.

According to such a conventional method, the produced silicon nitride powder is apt to contain a relatively large content of carbon.

As well-known, the content of carbon contained in the silicon nitride powder should be decreased in order to obtain a dense sintered body.

On the other hand, Japanese Patent Publication No. 57-44602 discloses a method for reducing and nitriding silica in a mixed gas atmosphere including hydrocarbon gas, ammonia gas and hydrogen gas. According to this conventional method, decomposition of $NH_3$ is restrained by the hydrogen gas which is mixed with the other gases so that $Si_3N_4$ synthesis reaction is retarded.

SUMMARY OF THE INVENTION

The object of this invention is to provide a method for making silicon nitride powder containing a very small content of carbon or substantially no carbon.

According to this invention, a mixture of silica powder and carbon powder is heated in a mixture of $NH_3$ gas and $C_mH_n$ gas. In another embodiment no carbon powder is used and only silica powder is heated in a mixed gas atmosphere containing $NH_3$ gas and $C_mH_n$ gas.

Preferably, the volumetric ratio of $NH_3/CH_4$ ranges between 0.5 and 2,000 when $C_mH_n$ is converted into $CH_4$ of a carbon standard. The heating temperature ranges between 800° C. and 1,500° C. Also, 0.4–10 wt. parts of carbon powder is mixed with 1 wt. part of silica powder, and 0.005–1 wt. part of seed powder is further added to 1 wt. part of silica powder. The seed powder is at least one selected from the group consisting of silicon nitride powder ($Si_3N_4$), silicon carbide powder (SiC), silicon oxi-nitride powder ($Si_2N_2O$) and metal silicon powder (Si). Further, 0.001–0.1 wt. part of catalyst may be added to 1 wt. part of silica powder. The catalyst is at least one selected from the group consisting of Mg, Ca, Zr, Be, Sr, Sn, Ge, Ti, Hf, Y, Th, La, Ce, Nb, Sc, Cr, Fe, Al and compounds thereof.

DESCRIPTION OF THE EMBODIMENTS

The inventors have discovered a new reason why silicon nitride powder produced according to a silica reducing method contains a relatively large content of carbon. According to the inventor's discovery, carbon is located inside each particle of the silicon nitride powder because the carbon is newly produced during the synthesis step is not an unreacted portion of the starting carbon powder.

Thus, the carbon contained in the silicon nitride powder cannot be easily removed by oxidizing the exteriors of the silicon nitride particles.

Assuming that S designates a solid state and G designates a gas condition, a silica reducing reaction can be expressed as follows:

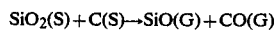
$$SiO_2(S) + C(S) \rightarrow SiO(G) + CO(G)$$

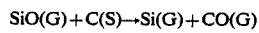
$$SiO(G) + C(S) \rightarrow Si(G) + CO(G)$$

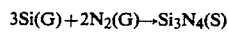
$$3Si(G) + 2N_2(G) \rightarrow Si_3N_4(S)$$

If the partial pressure of $N_2$ in the reaction system is low, or if the CO concentration is locally high, the reverse reactions of the above-stated first and second formulas occur so that C(S) is produced which becomes contained in each particle of the silicon nitride powder which is being produced.

Figure 1:
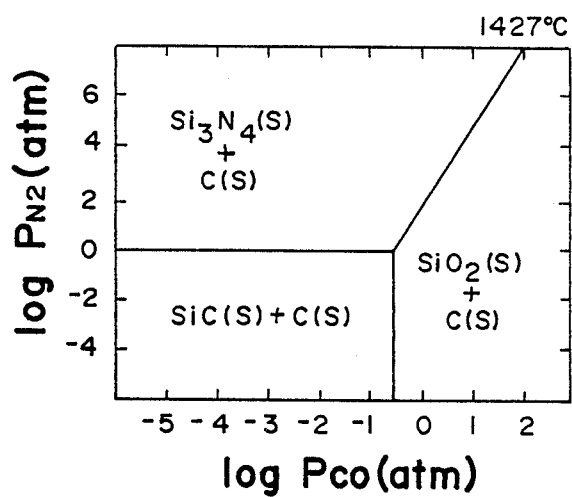
FIG. 1 is an explanatory view showing stable conditions in a Si—C—N—O condensed phase.

FIG. 1 shows stable relationships between $N_2$ partial pressures and CO partial pressures in a thermodynamic equilibrium condition of a silica reducing reaction at 1,427° C. with regard to Si—C—N—O in which there are $Si_3N_4$, SiC, $SiO_2$ and C in a condensed phase. Also, C may be present in an equilibrium relationship with $Si_3N_4$ in an area where $Si_3N_4$ powder is being produced. Thus, C is trapped in each particle of the $Si_3N_4$ powder during the synthesis step of $Si_3N_4$.

By taking into consideration the foregoing, it is apparent in theory that no carbon is contained in the silicon nitride powder if CO is completely removed from the atmosphere.

For example, CO can be removed as follows:

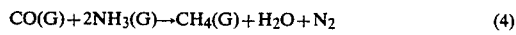
$$CO(G) + 2NH_3(G) \rightarrow CH_4(G) + H_2O + N_2 \quad (4)$$

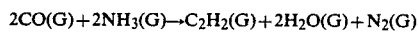
$$2CO(G) + 2NH_3(G) \rightarrow C_2H_2(G) + 2H_2O(G) + N_2(G)$$

Also, immediately after C is produced, it can be removed as follows:

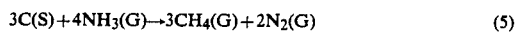
$$3C(S) + 4NH_3(G) \rightarrow 3CH_4(G) + 2N_2(G) \quad (5)$$

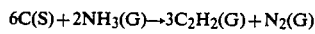
$$6C(S) + 2NH_3(G) \rightarrow 3C_2H_2(G) + N_2(G)$$

By removing CO or C in the above-stated manner, silicon nitride powder can be prevented from containing C.

If $NH_3$ gas only, or a mixture of $NH_3$ gas and an inert gas such as $N_2$ gas is used, it is supposed that silicon nitride powder is produced according to the following three reactions:

$$3SiO_2(S) + 6C(S) + 2N_2(G) \rightarrow Si_3N_4(S) + 6CO(G) \quad (1)$$

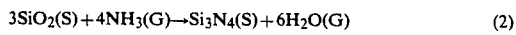
$$3SiO_2(S) + 4NH_3(G) \rightarrow Si_3N_4(S) + 6H_2O(G) \quad (2)$$

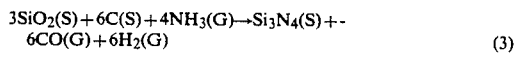
$$3SiO_2(S) + 6C(S) + 4NH_3(G) \rightarrow Si_3N_4(S) + 6CO(G) + 6H_2(G) \quad (3)$$

Accordingly, silicon nitride powder can be produced by a method in which silica powder and carbon powder are mixed in a predetermined ratio and then heated in a mixed gas atmosphere containing $NH_3$ gas and $C_mH_n$ gas (hydrocarbon gas). Some seed powder is preferably further added to the mixture of silica powder and carbon powder although it is not always required.

The $C_mH_n$ gas may be any hydrocarbon which can be changed into a hydrocarbon gas and carbon in a synthesis atmosphere.

$N_2$ gas and/or other inert gas or gases can be further added into the mixed gas atmosphere, if desired, so that the content of carbon contained in the silicon nitride powder can be decreased.

On the other hand, silicon nitride powder can be produced without use of carbon powder. For example, silicon nitride powder can be produced by heating silica powder in a mixed gas atmosphere containing $NH_3$ gas and $C_mH_n$ gas according to the above-stated formula (2).

In this reducing nitriding method, it should be noted that the hydrogen and nitrogen are active or in a nascent state because they are newly produced during the thermal decomposition step of $NH_3$.

According to this invention, both in the absence and in the presence of carbon powder as a starting material, the silicon nitride powder which is synthesized in the above-stated manner contains a very small content of carbon or substantially no carbon.

However, $Si_3N_4$ is oxidized by $H_2O$ which is produced according to the reaction of the above formula (2). Oxidization of $Si_3N_4$ can be avoided if a partial pressure of $H_2O$ in the atmosphere is low. For example, if a flow rate of $NH_3$ gas is high, then the partial pressure of $H_2O$ becomes low. In such a case, an inert gas such as $N_2$ or $C_mH_n$ gas can be mixed with $NH_3$ gas. When $C_mH_n$ is mixed with the $NH_3$ gas, $H_2O$ is removed according to the following formula:

$$mH_2O + C_mH_n \rightarrow mCO + (m+n/2)H_2$$

Figure 2:
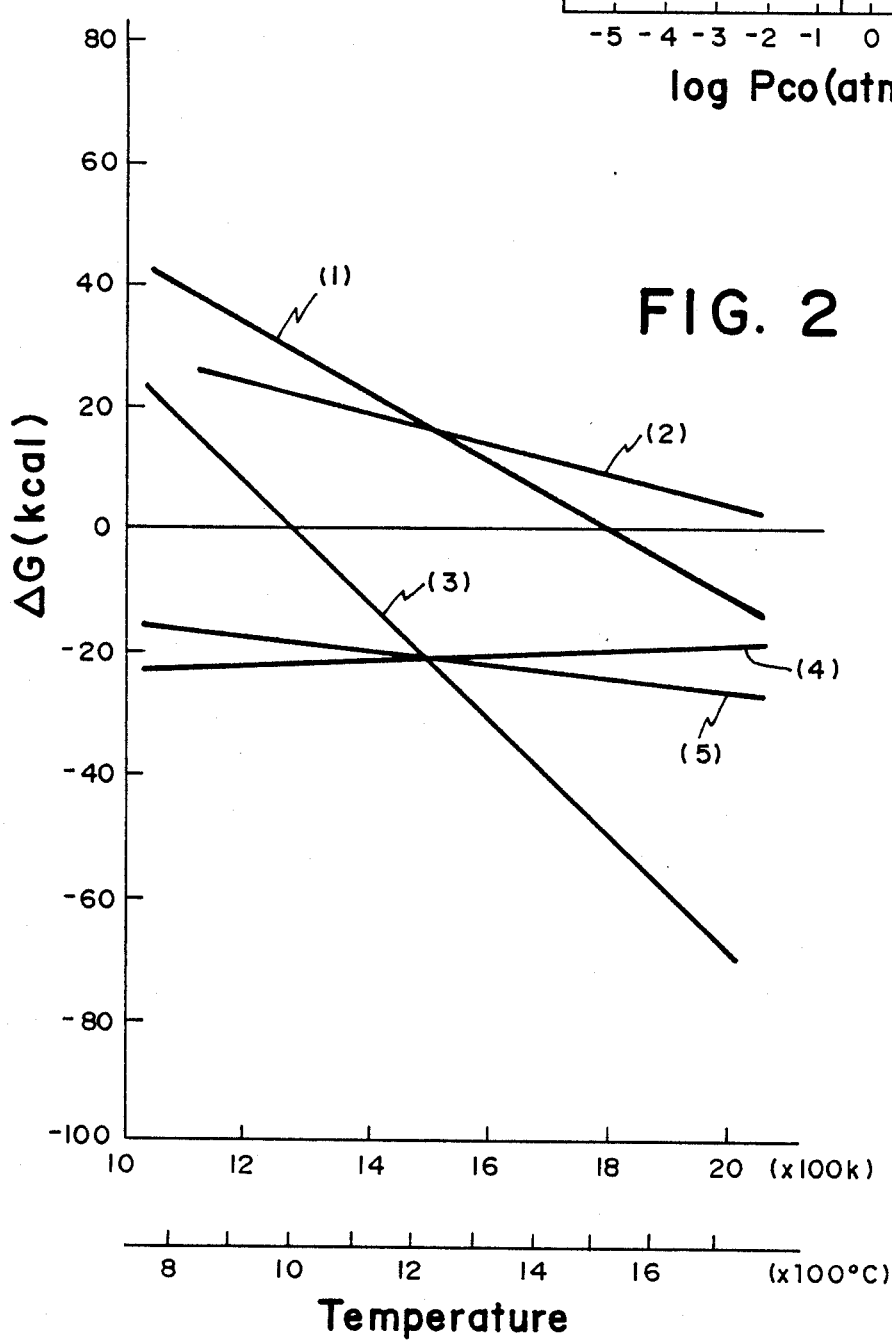
FIG. 2 is a graph showing standard free energy changes in the various reactions involved in the process of this invention.

FIG. 2 shows free energy changes according to the above-stated formulas (1) to (5). As $\Delta G$ becomes low, the reactions become easy. The synthesis reaction in a mixed gas atmosphere is preferable to that in a $N_2$ gas only. It can be seen from FIG. 2 that both CO and C produced in the above reactions can be easily consumed so as to be removed.

In case of the above formula (2), if too much of the hydrocarbon gas is added, when the hydrocarbon is thermal-decomposed, some carbon is produced so as to function as a reducing agent for silica.

According to this invention, a temperature at a synthesis step can be set low. If $NH_3$ gas is mixed with $N_2$ gas or any other inert gas, the production cost of the silicon nitride powder can be decreased.

In case no carbon powder is used as a starting material, the step of mixing silica powder with carbon powder can be omitted, and the working place is cleanlier. The yield of excellent silicon nitride powder can also be improved. Also, decarbonization after the synthesis step is not necessary.

EXAMPLES (1) to (4) and COMPARATIVE EXAMPLES (5) to (8)

Silica powder ($SiO_2$) having an average particle size of 20 milli-microns, carbon black powder (C) having an average particle size of 40 milli-microns and silicon nitride powder ($Si_3N_4$) having an average particle size of 0.1 microns were blended in the ratio shown in Table 1A. In the example (1), a catalyst was further added. In examples (1) to (4) the starting materials were subjected to a reducing nitriding treatment and a decarbonizing treatment under the conditions shown in Tables 1A and 1B.

The experimental results show that the silicon nitride powder which is produced in the above manner contains only a small content of carbon as shown in Table 1B.

Four comparative examples (5) to (8) which are outside of this invention were prepared as shown in Table 1A. The starting materials in comparative examples (5)–(7) were subjected to a reducing nitriding treatment in an atmosphere including $N_2$ gas only, omitting $NH_3$ gas. In the comparative example (8), the atmosphere contained $H_2$, $NH_3$ and $C_3H_8$. The experimental results of those comparative examples (5)–(8) are shown in Table 1B.

The silicon nitride powder of Example (1) and the silicon nitride powder of Comparative Example (7) were used in order to compare characteristics of sintered bodies. Each silicon nitride powder was blended with 5 wt. parts of $Y_2O_3$ and 5 wt. parts of $Al_2O_3$ and then mixed within a solvent such as n-butanol for 40 hours thereby to make a mixture. After the solvent has vaporized from the mixture, it was shaped into a body having a length of 50 mm, a width of 50 mm and a thickness of 40 mm by means of a mould. The body was further pressed by a rubber press means under a pressure of 1 ton/cm² thereby to obtain a pressed body. The pressed body was fired at 1,760° C. for 3 hours in an atmosphere containing nitrogen gas so as to be sintered.

In case of Example (1), the sintered body had a bulk density of 3.20 g/cm³. In case of the comparative example (7), the sintered body had a bulk density of 2.91 g/cm³.

In order to obtain best results, the volumetric ratio of $NH_3$ gas to $CH_4$ gas preferably ranges between 0.5 and 2,000 when $C_mH_n$ is converted into $CH_4$ of a carbon standard. If the ratio of $NH_3/CH_4$ is less than 0.5, carbon cannot be removed to a desired degree. If the ratio of $NH_3/CH_4$ is larger than 2,000, the hydrocarbon gas cannot effectively remove the $H_2O$ which is produced during the reaction so that the total content of oxygen in the powder product increases.

In the silicon nitride powder, the total carbon content is preferably less than 0.5 wt. part, and the total oxygen content is less than 2.5 wt. part.

It is preferable to use 0.4–10 wt. parts of carbon to 1 wt. part of $SiO_2$ because 0.4 wt. part of C is normally required in order to reduce 1 wt. part of $SiO_2$.

EXAMPLES (9) to (12) and COMPARATIVE EXAMPLES (13) to (16)

Silica powder ($SiO_2$) having an average particle size of 20 microns and silicon nitride powder ($Si_3N_4$) having an average particle size of 0.1 microns were blended in the ratios shown in Table 2A. In the example (12), a catalyst was further added. All examples (9)–(12) were subjected to a reducing nitriding treatment and a decarbonizing treatment under the conditions shown in Tables 2A and 2B.

The experimental results show that the silicon nitride powder which as produced in the above manner contains only a small content of carbon as shown in Table 2B.

Four comparative examples (13)–(16) which are outside of this invention were prepared as shown in Table 2A. The comparative examples (13)–(15) were subjected to a reducing nitriding treatment in an atmosphere including N₂ gas only, omitting NH₃ gas. In the comparative example (16), the atmosphere contained H₂, NH₃ and C₃H₈. The experimental results of those comparative examples (13)–(16) are shown in Table 2B.

The silicon nitride powder of Example (1) and the silicon nitride powder of the Comparative Example (15) were used in order to compare characteristics of sintered bodies. Each silicon nitride powder was blended with 5 wt. parts of $Y_2O_3$ and 5 wt. parts of $Al_2O_3$ and then mixed within a solvent such as n-butanol for 40 hours thereby to make a mixture. After the solvent has vaporized from the mixture, it was shaped into a body having a length of 50 mm, a width of 50 mm and a thickness of 40 mm by means of a mould. The body was further pressed by a rubber press means under a pressure of 1 ton/cm² to thereby obtain a pressed body. The pressed body was fired at 1,760° C. for 3 hours in an atmosphere containing nitrogen so as to be sintered.

In case of Example (9), the sintered body had a bulk density of 3.19 g/cm³. In case of the comparative example (15), the sintered body had a bulk density of 2.91 g/cm³.

The conditions for obtaining best results are substantially the same as those of the examples (1)–(4). However, in the silicon nitride powder, preferably the total carbon nitride content is less than 0.3 wt. part, and the total oxygen content is less than 3.5 wt. part.

TABLE 1A

| | Content wt. Ratio of Starting Materials | | | | Synthesis Conditions | | |
|---|---|---|---|---|---|---|---|
| No. | SiO₂ | C | Si₃N₄ | Catalyst | Temperature °C. | Time Hr. | Atmosphere (%) (Gas Flow Rate = 8 cm/sec) |
| Examples | | | | | | | |
| 1 | 1 | 1 | 0.1 | — | 1420 | 5 | NH₃ 99 C₃H₈ 1 |
| 2 | 1 | 0.6 | 0.1 | — | 1400 | 5 | NH₃ 80 C₃H₈ 0.1 N₂ 19.9 |
| 3 | 1 | 2 | 0.5 | — | 1350 | 5 | NH₃ 60 C₃H₈ 0.5 N₂ 81 |
| 4 | 1 | 1 | 0.05 | MgO 0.01 | 1300 | 5 | NH₃ 15 C₃H₈ 4 N₂ 81 |
| Comparative Examples | | | | | | | |
| 5 | 1 | 2 | 0.5 | — | 1450 | 5 | N₂ 100 |
| 6 | 1 | 1 | 0.05 | MgO 0.01 | 1400 | 8 | N₂ 100 |
| 7 | 1 | 0.6 | 0.1 | — | 1450 | 6 | N₂ 100 |
| 8 | 1 | 0.6 | 0.1 | — | 1420 | 5 | H₂ 93 NH₃ 4.7 C₃H₈ 2.3 |

TABLE 1B

| | | Characteristics of Produced Powder | | | |
|---|---|---|---|---|---|
| No. | Decarbonating Conditions | All content of carbon % | All content of oxygen % | N Ratio % | α-Si₃N₄ % |
| Examples | | | | | |
| 1 | Heated at | 0.10 | 1.99 | 38.2 | 97 |
| 2 | 650° C. for | 0.13 | 1.52 | 38.6 | 98 |
| 3 | 5 hours | 0.16 | 2.01 | 38.3 | 98 |
| 4 | in an atmospheric air | 0.21 | 1.87 | 38.0 | 97 |
| Comparative Examples | | | | | |
| 5 | heated at | 0.57 | 2.13 | 37.6 | 97 |
| 6 | 650° C. for | 0.61 | 1.88 | 37.8 | 97 |
| 7 | 5 hours | 0.72 | 1.94 | 37.6 | 99 |
| 8 | in an atmospheric air | 1.8 | 3.1 | 37.4 | 95 |

TABLE 2A

| | Content wt. Ratio of Starting Materials | | | | Synthesis Conditions | | |
|---|---|---|---|---|---|---|---|
| No. | SiO₂ | C | Si₃N₄ | Catalyst | Temperature °C. | Time Hr. | Atmosphere (%) (Gas Flow Rate = 8 cm/sec) |
| Examples | | | | | | | |
| 9 | 1 | — | 0.1 | — | 1420 | 5 | NH₃ 99 C₃H₈ 1 |
| 10 | 1 | — | 0.1 | — | 1400 | 5 | NH₃ 80 C₃H₈ 0.1 N₂ 19.9 |
| 11 | 1 | — | 0.5 | — | 1350 | 5 | NH₃ 60 C₃H₈ 0.5 N₂ 39.5 |
| 12 | 1 | — | 0.05 | MgO 0.01 | 1300 | 5 | NH₃ 15 C₃H₈ 4 N₂ 81 |
| Comparative Examples | | | | | | | |
| 13 | 1 | 2 | 0.5 | — | 1450 | 5 | N₂ 100 |
| 14 | 1 | 1 | 0.05 | MgO 0.01 | 1400 | 8 | N₂ 100 |
| 15 | 1 | 0.6 | 0.1 | — | 1450 | 6 | N₂ 100 |
| 16 | 1 | — | — | — | 1420 | 5 | H₂ 93 NH₃ 4.7 C₃H₈ 2.3 |

TABLE 2B

| | | Characteristics of Produced Powder | | | |
|---|---|---|---|---|---|
| No. | Decarbonating Conditions | All content of carbon % | All content of oxygen % | N Ratio % | α-Si₃N₄ % |
| Examples | | | | | |
| 9 | No decarbonating | 0.09 | 2.10 | 38.1 | 96 |
| 10 | | 0.05 | 1.63 | 38.4 | 96 |
| 11 | | 0.05 | 2.12 | 38.2 | 97 |
| 12 | | 0.17 | 2.08 | 37.9 | 96 |
| Comparative Examples | | | | | |
| 13 | heated at | 0.57 | 2.13 | 37.6 | 97 |
| 14 | 650° C. for | 0.61 | 1.88 | 37.8 | 97 |
| 15 | 5 hours | 0.72 | 1.94 | 37.6 | 99 |
| 16 | in an atmospheric air | 1.5 | 3.5 | 36.5 | 95 |

We claim:

1. A method for producing silicon nitride comprising:
   mixing silica powder and carbon powder, in a gaseous atmosphere consisting essentially of NH₃ and CmHn, to form an admixture consisting essentially of silica and carbon;
   feeding a mixed gas consisting essentially of NH₃ and CmHn into said gaseous atmosphere;
   heating said admixture in said gaseous atmosphere so that said NH₃ and CmHn react with said silica and said carbon to form said silicon nitride and to produce H₂O as an intermediate reaction product, said CmHn reacting with said H₂O according to the following equation:

$$mH_2O + CmHn \rightarrow mCO + (m+n/2)H_2$$

whereby H₂O produced during the reaction is removed from the said gaseous atmosphere.

2. The method of claim 1, wherein a volume ratio of NH₃/CH₄ ranges between 0.5 and 2,000 when $C_mH_n$ is converted into CH₄ of a carbon standard.

3. The method of claim 1, wherein a heating temperature for the mixture ranges between 800° C. and 1,500° C.

4. The method of claim 1, wherein 0.4–10 wt. parts of carbon powder is mixed with 1 wt. part of silica powder.

5. The method of claim 1, wherein 0.005–1 wt. part of seed powder is further added to 1 wt. part of silica powder, the seed powder being at least one selected from the group consisting of Si₃N₄, SiC, Si₂N₂O and Si.

6. The method of claim 1, wherein 0.001–0.1 wt. part of catalyst is further added to 1 wt. part of silica powder, the catalyst being at least one selected from the group consisting of Mg, Ca, Zr, Be, Sr, Sn, Ge, Ti, Hf, Y, Th, La, Ce, Nb, Sc, Cr, Fe, Al and a compound thereof.

7. The method of claim 1, wherein the total carbon content of the silicon nitride powder is less than 0.5 wt. % and the total oxygen content of the silicon nitride powder is less than 2.5 wt. %.

8. The method of claim 1 wherein said gaseous atmosphere contains at least one inert gas.

9. A method for producing silicon nitride comprising:
heating a powder consisting essentially of silica, and free of carbon, in a gaseous atmosphere consisting essentially of NH₃ and CmHn;
supplying a mixed gas consisting essentially of NH₃ and CmHn into said gaseous atmosphere so that said NH₃ reacts with said silica according to the first equation:

$$3SiO_2 + 4NH_3 \rightarrow Si_3N_4 + 6H_2O$$

said H₂O reacting with said CmHn according to the second equation:

$$mH_2O + CmHn \rightarrow mCO + (m+n/2)H_2$$

whereby H₂O produced during the reaction is removed from said gaseous atmosphere.

10. The method of claim 9, wherein a volume ratio of NH₃/CH₄ ranges between 0.5 and 2,000 when $C_mH_n$ is converted into CH₄ of a carbon standard.

11. The method of claim 9, wherein a heating temperature for the silica powder ranges between 800° C. and 1,500° C.

12. The method of claim 9, wherein the total carbon content of the silicon nitride powder is less than 0.3 wt. % and the total oxygen content is less than 3.5 wt. %.

13. The method of claim 9, wherein 0.005–1 wt. part of seed powder is further added to 1 wt. part of silica powder, the seed powder being at least one selected from the group consisting of Si₃N₄, SiC, Si₂N₂O and Si.

14. The method of claim 9, wherein 0.001–0.1 wt. part of catalyst is further added to 1 wt. part of silica powder, the catalyst being at least one selected from the group consisting of Mg, Ca, Zr, Be, Sr, Sn, Ge, Ti, Hf, Y, Th, La, Ce, Nb, Sc, Cr, Fe, Al and a compound thereof.

15. The method of claim 9 wherein said gaseous atmosphere contains at least one inert gas.

* * * * *